April 12, 1966 A. W. GERRANS 3,245,561
APPARATUS FOR DUMPING CONTAINERS
Filed Feb. 6, 1962 9 Sheets-Sheet 2

FIG_2

INVENTOR.
ALFRED W. GERRANS
BY
Naylor + Neal
ATTORNEYS

April 12, 1966   A. W. GERRANS   3,245,561
APPARATUS FOR DUMPING CONTAINERS
Filed Feb. 6, 1962   9 Sheets-Sheet 5

FIG_7

FIG_8

INVENTOR.
ALFRED W. GERRANS
BY
*Naylor & Neal*
ATTORNEYS

April 12, 1966        A. W. GERRANS        3,245,561

APPARATUS FOR DUMPING CONTAINERS

Filed Feb. 6, 1962        9 Sheets-Sheet 6

INVENTOR.
ALFRED W. GERRANS
BY
*Naylor + Neal*
ATTORNEYS

April 12, 1966 A. W. GERRANS 3,245,561
APPARATUS FOR DUMPING CONTAINERS
Filed Feb. 6, 1962 9 Sheets-Sheet 9

FIG_13

INVENTOR.
ALFRED W. GERRANS
BY Naylor & Neal
ATTORNEYS

United States Patent Office 3,245,561
Patented Apr. 12, 1966

3,245,561
APPARATUS FOR DUMPING CONTAINERS
Alfred W. Gerrans, San Jose, Calif., assignor to Sunsweet Dryers, San Jose, Calif., a corporation of California
Filed Feb. 6, 1962, Ser. No. 171,489
11 Claims. (Cl. 214—313)

This invention relates to container handling equipment and more particularly to a method and apparatus for dumping open-mouthed containers of the type used for handling agricultural produce in bulk.

Large containers, called fruit bins in some applications, are used in many situations in the harvesting and handling of types of produce which do not bruise easily or which are destined for subsequent processing operations which do not require that care be taken to avoid bruising of the produce. The large containers or bins used for these purposes are of sufficient size that they must be handled by power equipment, and it is customary to handle them with fork lift trucks. Normally the containers arrive on a truck at a food processing plant with the containers stacked in tiers on the truck. The containers are then caried individually from the truck to a dumping station by a fork lift. The fruit or vegetables in the container are dumped into a hopper, and the empty container is returned to the truck.

Because of the necessity of completing produce handling operations as rapidly as possible during the height of the harvesting season for a particular crop, it is often necessary to employ a plurality of fork lifts in this operation so that each truckload of containers can be dumped into the hopper as rapidly as possible, and for this reason, it is often necessary to provide a plurality of container dumping stations around a single hopper with each dumping station serviced by one or more fork lifts and connected to the hopper by a conveyor. Of course, the addition of each extra dumping station and the use of a conveyor with each dumping station adds to the cost of the installation and adds to the floor space of a plant which must be used for receiving incoming produce.

It is a principal object of this invention to provide apparatus for dumping containers with which a large number of containers can be dumped as rapidly as possible and with a minimum amount of equipment.

It is another principal object of the invention to provide such apparatus with which containers can be dumped in stacked pairs so that a single fork lift can handle twice as many containers in a given time as it could handle individually.

It is another object of the invention to provide such apparatus which will handle either one container or a pair of containers, whichever is delivered thereto by the fork lift.

It is another object of the invention to provide such apparatus on which a pair of stacked containers can be placed by a fork lift and which will be operative to dump the containers and return them to the fork lift in stacked condition without requiring the fork lift to move while the containers are being dumped.

It is another object of the invention to provide such container dumping apparatus which will require a minimum overhead clearance for dumping of the containers at a selected dumping height.

It is another object of the invention to provide such container dumping apparatus which may be designed for lifting the containers to a selected height and then inverting the containers to dump their contents where inversion of the loaded containers is initiated at a position where the weight of the containers will not apply excessive forces to power means operating the apparatus.

It is another object of the invention to provide such apparatus which will occupy a minimum area of floor space in a food processing plant.

It is another object of the invention to provide such apparatus which will be operated automatically through its sequence of motions by a single power means which may be actuated by the fork lift operator from his position on his fork lift truck when the delivers a pair of stacked containers to the apparatus.

It is another object of the invention to provide such container dumping apparatus which is simple and rigorous in construction and which is capable of long periods of trouble free use.

Other objects and advantages of the invention will become apparent from the following description of a specific embodiment of the invention read in conjunction with the attached drawings in which:

in FIG. 1;

Figure 1:
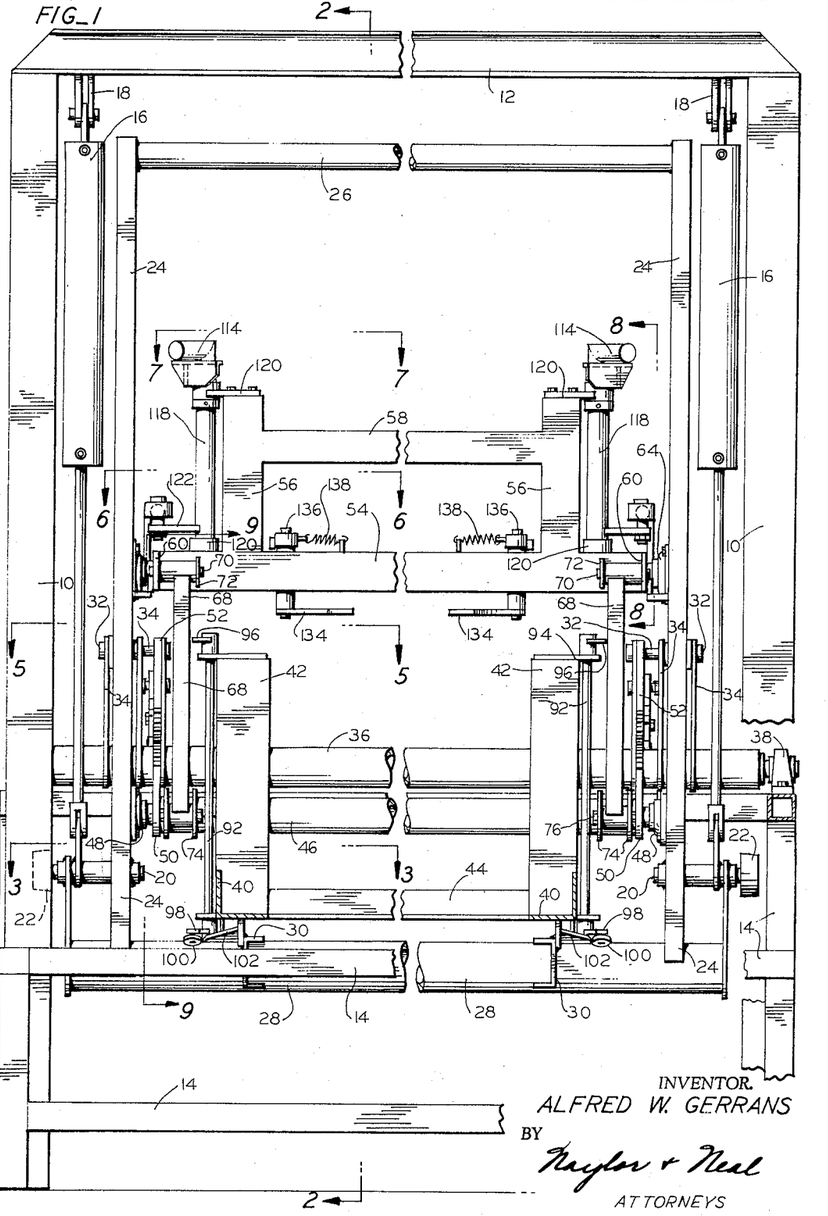
FIG. 1 is a view in front elevation of container dumping apparatus constructed in accordance with this invention.
Figure 2:
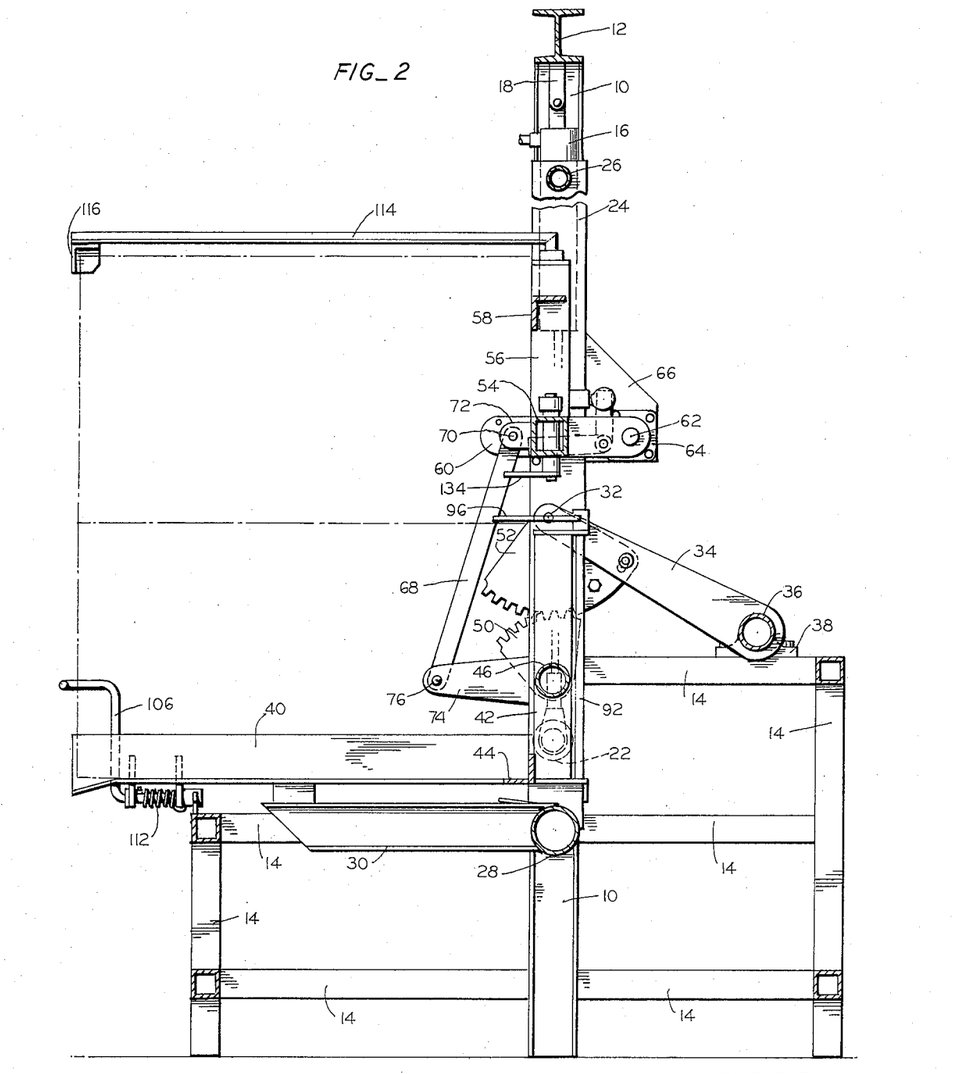
FIG. 2 is a view in vertical section centrally of the apparatus of FIG. 1.

Referring now in detail to the drawings and particularly to FIGS. 1 and 2, the apparatus includes an outer main structural frame having a pair of spaced apart generally vertical I-beams 10 supporting a top beam 12 with a plurality of structural members 14 connected thereto and defining a rigid base for the frame which extends in front of and behind a vertical plane through the I-beams 10. A pair of double-acting hydraulic rams 16 are suspended from brackets 18 on the top beam 12 with the lower ends of the rams 16 being connected to stub shafts 20 which carry guide rollers 22 which are in turn received in the vertical channels of the I-beams 10.

An inner frame supported on the main frame is constructed of longitudinal members 24 and upper and lower cross braces 26 and 28 respectively, with a pair of forks 30 rigidly mounted on the lower brace member 28. The members 24 of the inner frame are mounted on the stub shafts 20 adjacent to their lower ends so that the lower end of the inner frame is lifted responsive to contraction of the rams 16. The members 24 of the inner frame are also connected by pivot shafts 32 to link arms 34 which are rigidly mounted on a trunnion 36 which is in turn journaled in journals 38 on the main frame members 14 behind the vertical plane through the I-beams 10. It will thus be seen that upon contraction of the rams 16, the lower end of the inner frame will move upwardly along a vertical path guided by the rollers 22 while the upper end of the inner frame will swing laterally as the arms 34 swing about the axis of trunnion 36.

A lower container holding frame is mounted on the inner frame and includes a pair of lower angle irons 40 connected to upright structural members 42 which are interconnected by a brace 44 and a trunnion 46. The trunnion 46 is journaled in bearings 48 which support the lower container holding frame on the inner frame members 24. A lower gear 50 is rigidly attached to the trunnion 46 and meshes with an upper gear 52 which is carried on bearings on the shaft 32. As will be explained in greater detail hereinafter the gears 50 and 52 radially support the lower container holding frame on the inner frame and control swinging of the lower container holding frame with respect to the inner frame.

An upper container holding frame includes a square tubing member 54 having uprights 56 connected thereto with the members 56 being interconnected by a cross brace 58. The square tube 54 is rigidly mounted on a pair of arms 60 which are pivotally connected to the upright members 24 of the inner frame by means of stub shafts 62 (see FIG. 2) which are received in journals 64, and the journals 64 are mounted on brackets 66 (see FIG. 2) which are mounted on the inner frame uprights 24 behind the plane of the I-beams 10. The upper container holding frame is connected to the lower container holding frame by a pair of links 68 which are pivotally connected to a shaft 70 which is retained between the arms 60 and brackets 72 on the square tube 54; the lower ends of the links 68 are pivotally connected to arms 74 on the trunnions 46 by means of pins 76. It will thus be seen that when the lower container holding frame swings with respect to the inner frame about the axis of trunnion 46, the upper container holding frame will swing with respect to the inner frame about the axis of shafts 62, and, during this joint swinging motion, the upper container holding frame is swinging faster than the lower container holding frame so that the two frames are swinging apart from each other.

Figure 9:
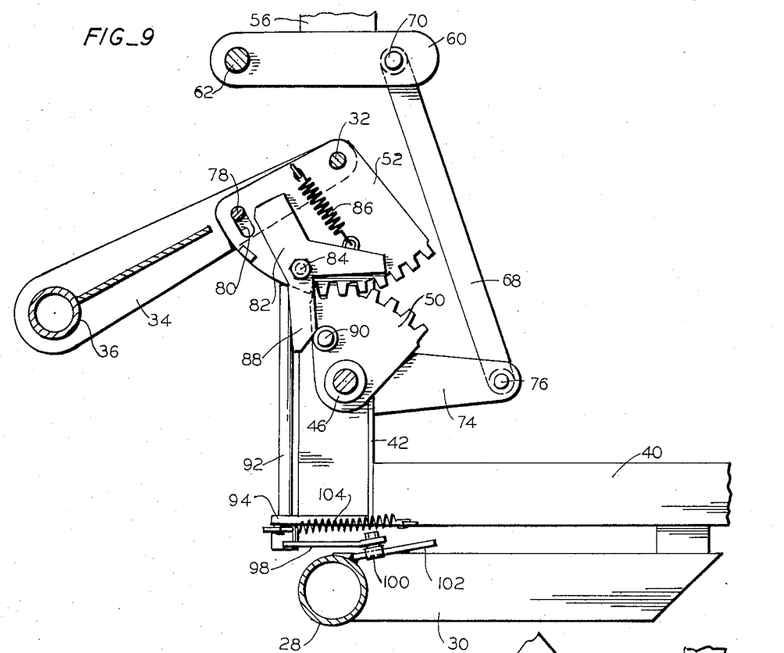
Figure 10:
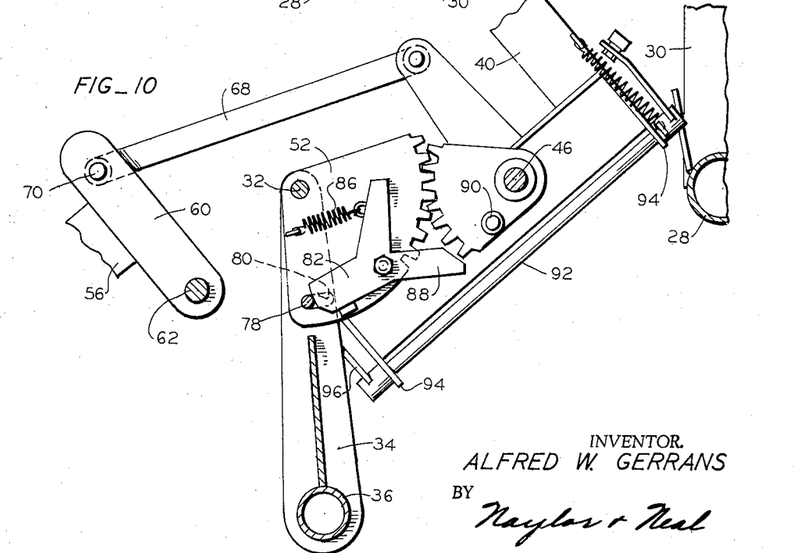
FIG. 10 is a view similar to FIG. 9 showing the position of the parts when the apparatus is in dumping position.

As mentioned above the swinging of the lower container holding frame with respect to the inner frame is effected by the gears 50 and 52, and reference is made to FIGS. 9 and 10 where the manner of operation of these gears is illustrated in greater detail. In FIG. 9 it will be noted additionally that gear 52 is mounted on pivot pin 32 for movement with respect to arm 34, and a pin 78 is mounted on the arm 34 and received in an elongated aperture 80 in gear 52 to limit relative movement between the gear 52 and the arm 34. With this limited relative movement permitted between the gear 52 and the arm 34, the initial swinging of the inner frame members 24 with respect to the outer frame does not effect relative rotation of the container holding frames with respect to the inner frame. During this initial movement, the angle subtended at the axis of shaft 32 between the axis of rollers 22, pin shafts 32, and trunnion 36 decreases until the rollers 22 are on the same horizontal plane with the trunnion 36, and at this position the pin 78 has moved in the aperture 80 to the opposite end of the aperture 80 from its position illustrated in FIG. 9. Further upward movement of the rollers 22 causes the pin 78 to move back to the position illustrated in FIG. 9 until it arrives at the illustrated position when the wheels 22 have risen to the same distance above truunion 36 which they were originally below trunnion 36.

As the rollers 22 continue to rise from this point, the pin 78 prevents relative movement between the gear 52 and the arm 34, and the gear 52 then rotates with respect to the upright member 42 of the lower container holding frame. This rotation is imparted to gear 50 which turns trunnion 46 to swing the lower container holding frame with respect to the inner frame members 24. With further reference to FIG. 9, a pivotal dog 82 is mounted on the gear 52 by a pivot bolt 84 and spring biased thereon by a spring 86. An arm 88 on the dog 82 engages a stop member 90 on the gear 50 so that the dog 82 is disengaged from the pin 78 when the inner frame members 24 start to move upwardly with respect to the outer frame members 10, and this disengagement of the dog 82 from the pin 78 permits the swinging of the container holding frames with respect to the inner frame to be delayed during the initial portion of the swinging movement of the inner frame with respect to the outer frame.

When the gear 50 starts to rotate as described above, the stop member 90 moves away from the arm 88 so that the dog 82 is moved under the action of spring 86 to a position engaging the pin 78 so that further rotation of the container holding frames with respect to the inner frame is accomplished with the gear 52 locked to the arm 34. This locking of the gear 52 prevents movement of the pin 78 in the aperture 80 and consequent whipping of the container holding frames when the centers of gravity of the lower and upper container holding frames move across vertical planes through the trunnion 46 and shafts 62 respectively. The locking of the pin 78 also provides for smooth movement of the container holding frames in restacking the containers held thereon after the containers have been dumped. It should be noted that during the reverse cycle of operation when the rollers 22 are moving downwardly in the channels in the I-beams 10, the stop members 90 engage the fingers 88 to positively unlatch the dogs 82 from engagement with the pins 78.

Figure 5:
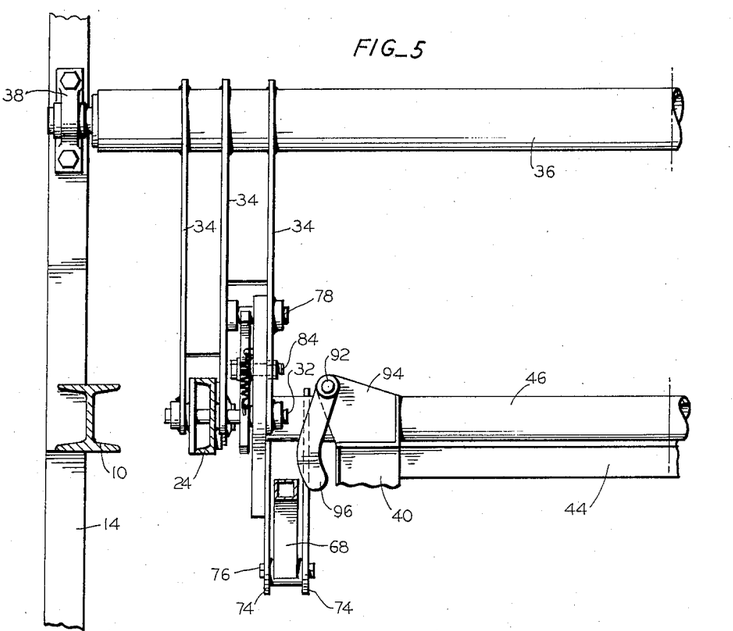
FIGS. 5, 6 and 7 are horizontal sectional views taken along the planes indicated at 5—5, etc.

With respect to FIGS. 1, 9 and 10, one additional feature of the apparatus should be pointed out. An elongated shaft 92 is rotatively mounted in brackets 94 on the upright members 42 of the lower container holding frame with the upper ends of the shafts 92 carrying container locking dogs 96 which are adapted to engage the top rear edge of a container on the lower container holding frame and limit movement of such container toward the upper container holding frame. These dogs facilitate operation of the apparatus when dumping a pair of stacked containers, but these dogs are more important in their function of holding in place a single container when containers are placed on the apparatus for individual dumping. As indicated in FIGS. 1 and 5, the dogs 96 are positioned to be out of engagement with the containers when containers are first placed on the apparatus so that the dogs will not interfere with initial placement of the containers on the apparatus. Manipulating means are provided on the lower ends of the shafts 92 to move the dogs 96 into engagement with the upper back edges of the lower container as the container holding frames start to rotate with respect to the inner frame members 24. Thus, as illustrated in FIG. 9 a radial arm 98 is mounted on the lower end of each shaft 92 and carries a cam follower 100 which in turn engages an inclined cam 102 on the inner frame cross member 28. When the lower container holding frame starts to swing with respect to the inner frame responsive to rotation of gear 50, the cam follower 100 moves along cam 102 to permit dogs 96 to move into position under the action of biasing spring 104. The connection of biasing spring 104 is best illustrated in FIG. 3.

Figure 3:
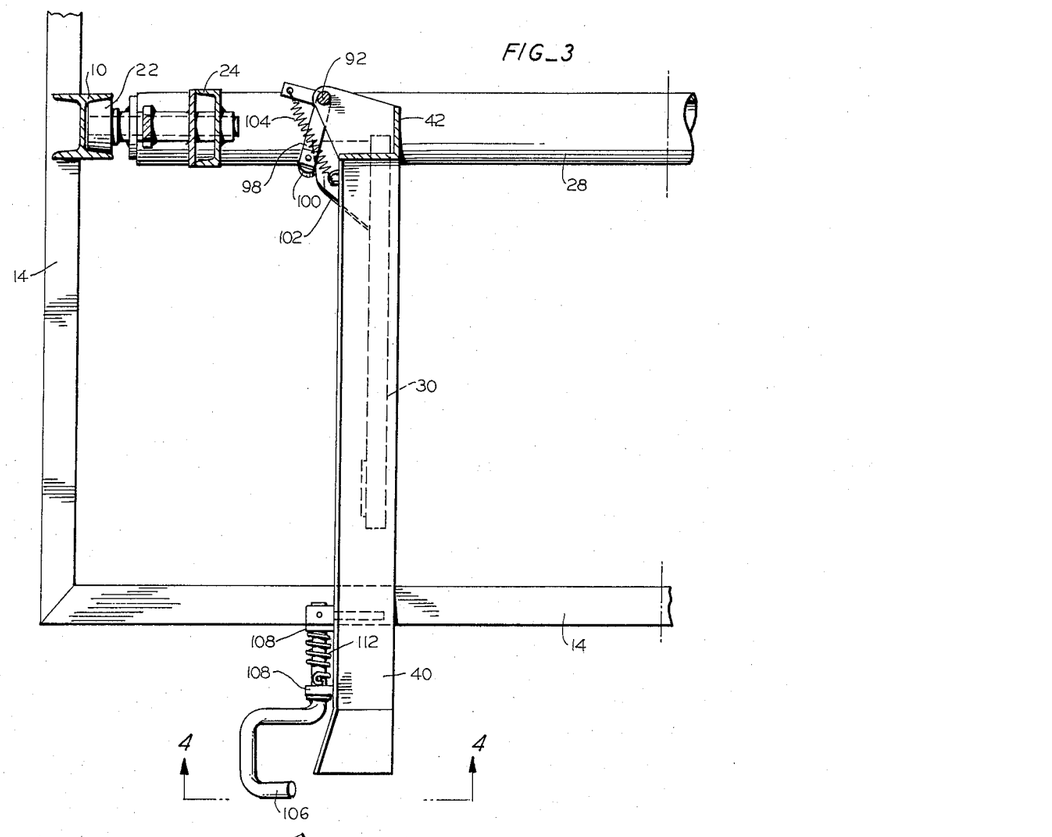
FIG. 3 is a horizontal sectional view taken along the plane indicated at 3—3 of FIG. 1.
Figure 4:
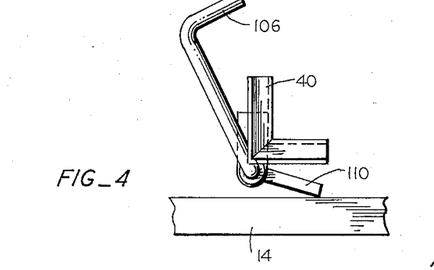
FIG. 4 is a fragmentary elevational view taken along the plane indicated at 4—4 in FIG. 3.

When a single container is dumped without a second container stacked upon it, the dogs 96 engage and hold the top back corner of the container, and the bottom front corners of the container are engaged and held by latch members 106 which are most clearly illustrated in FIGS. 2, 3 and 4. The latch members 106 are mounted in brackets 108 on the lower container holding frame members 40 with the latch member carrying a manipulating arm 110 which engages the main frame members 14 to unlatch the members 106 when the apparatus is in container receiving position. The latch members 106 carry torsion springs 112 which move the members 106 into latching position as the cycle of operation of the apparatus starts.

Figure 6:
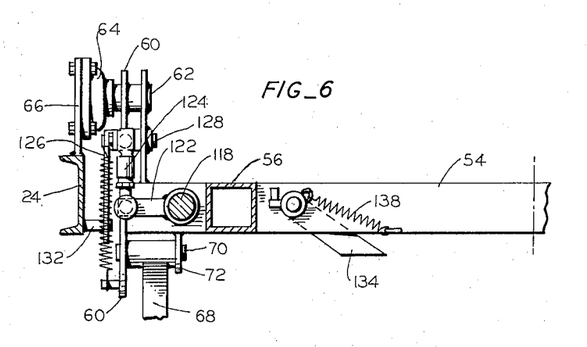
Figures 7, 8:
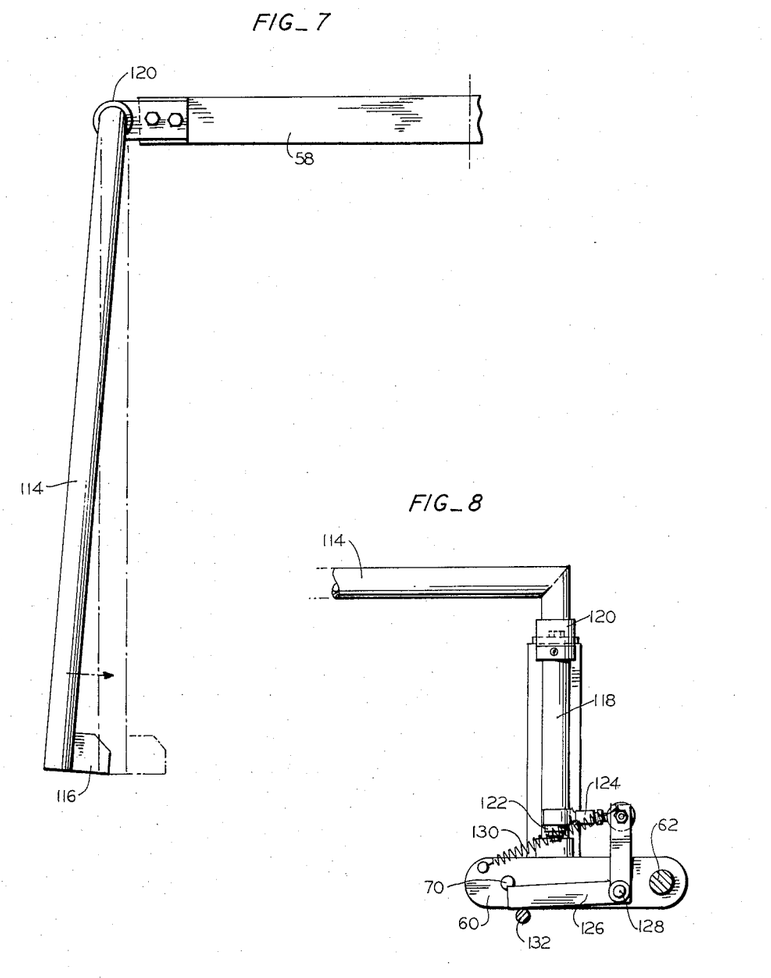
FIGS. 8 and 9 are vertical sectional views taken along the indicated planes in FIG. 1.

Referring now to FIGS. 7–8, a pair of upper arms 114 are mounted on the upper container holding frame for engagement of and support of the top edges of the upper container of a pair of containers being dumped by the apparatus. The arms 114 carry angle brackets 116 on their outer ends for latching around the outside corners of the upper container. The arms 114 are mounted on vertical shafts 118 which are mounted on the upper container holding frame by brackets 120. The arms 114 are swung about the axes of shafts 118 between operative positions illustrated in phantom outline in FIG. 7 and inoperative positions laterally spaced from the operative positions to facilitate introduction of containers into the apparatus. The arms 114 are moved between their operative and inoperative positions by levers 122 (see FIGS. 6 and 8) which are connected by links 124 to rocker arms 126. The rocker arms 126 are pivotally mounted on the upper container holding frame arms 60 at pivot pins 128 and are engaged by a biasing spring 130 which is adapted to pull the rocker arm 126 to a position where the links 124 and 122 will move the arms 114 to the operative position illustrated in phantom outline in FIG. 7. A stop pin 132 (see FIGS. 6 and 8) is mounted on the inner frame members 24 positioned to engage the rocker arm 126 and move it against the action of biasing spring 130 when the apparatus is in its container receiving position. When the container holding frames start to move with respect to the inner frame members 24 responsive to the action of the gears 50 and 52, the rocker arm 126 moves away from the stop 132 to cause the arms 114 to move to their operative position.

Finally referring to FIGS. 1 and 6, a pair of plates are mounted on the square tubing member 54 of the upper container holding frame with the plates 134 being mounted on pins 136 for pivotal movement with respect to the square tubing 54. Biasing springs 138 interconnect the square tubing 54 to collars on the pins 136 to urge the plates 134 to positions extending underneath the bottom of a container supported on the upper container holding frame. As containers are inserted into the apparatus, the containers may push the plates 134 out of the way, but when the lower container is lowered onto the lower container holding frame, the plates 134 will snap into the space between the two containers. In this regard, it should be noted in FIGS. 11, 12 and 13 that the containers used in this apparatus are of a standard type which are handled by fork lift trucks, and the containers have skids along their side edges which provide an open space between them. The containers are also normally provided with cross bars along their upper front and rear edges as shown in FIGS. 11–13.

*Sequence of operation*

Figure 11:
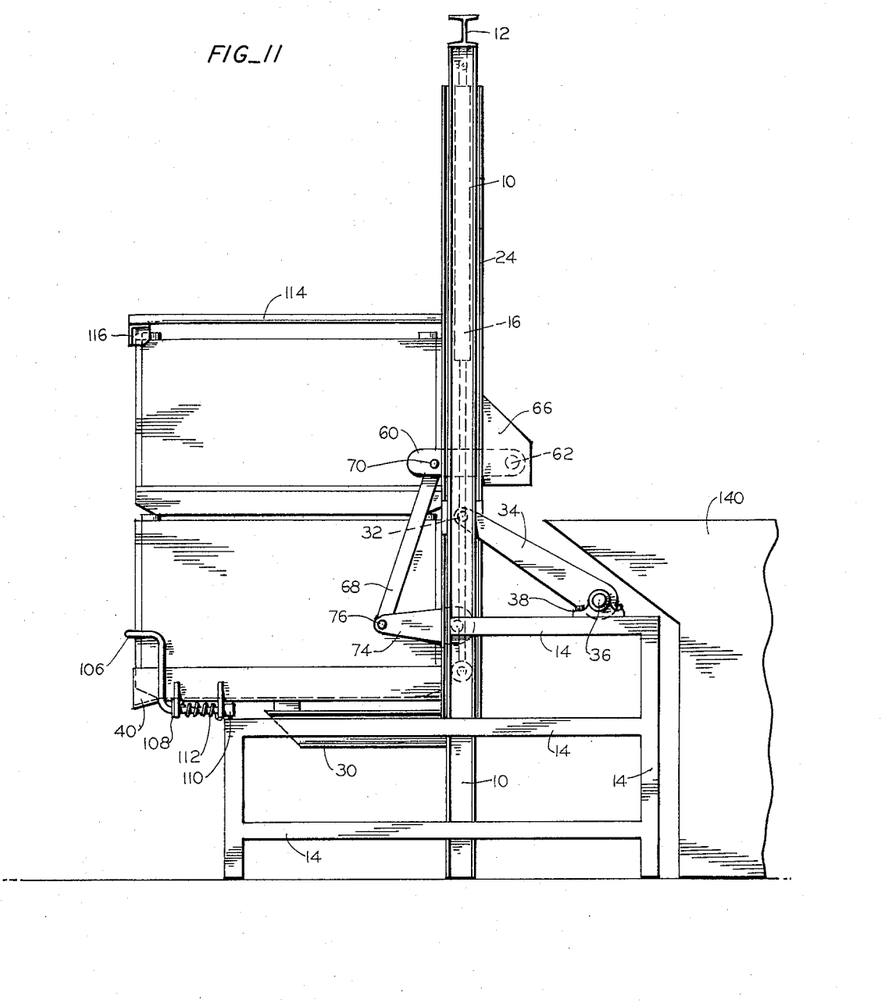
FIGS. 11, 12 and 13 are views in side elevation of the apparatus of FIG. 1 showing three successive stages of its operation in a container dumping cycle, FIG. 11 showing the condition of the apparatus at the beginning and end of a cycle, FIG. 12 showing the condition of the apparatus at an intermediate portion of the cycle when the two containers start to move with respect to each other, and FIG. 13 showing the apparatus at the midpoint of its cycle of operation when the containers are in dumping position.
Figure 12:
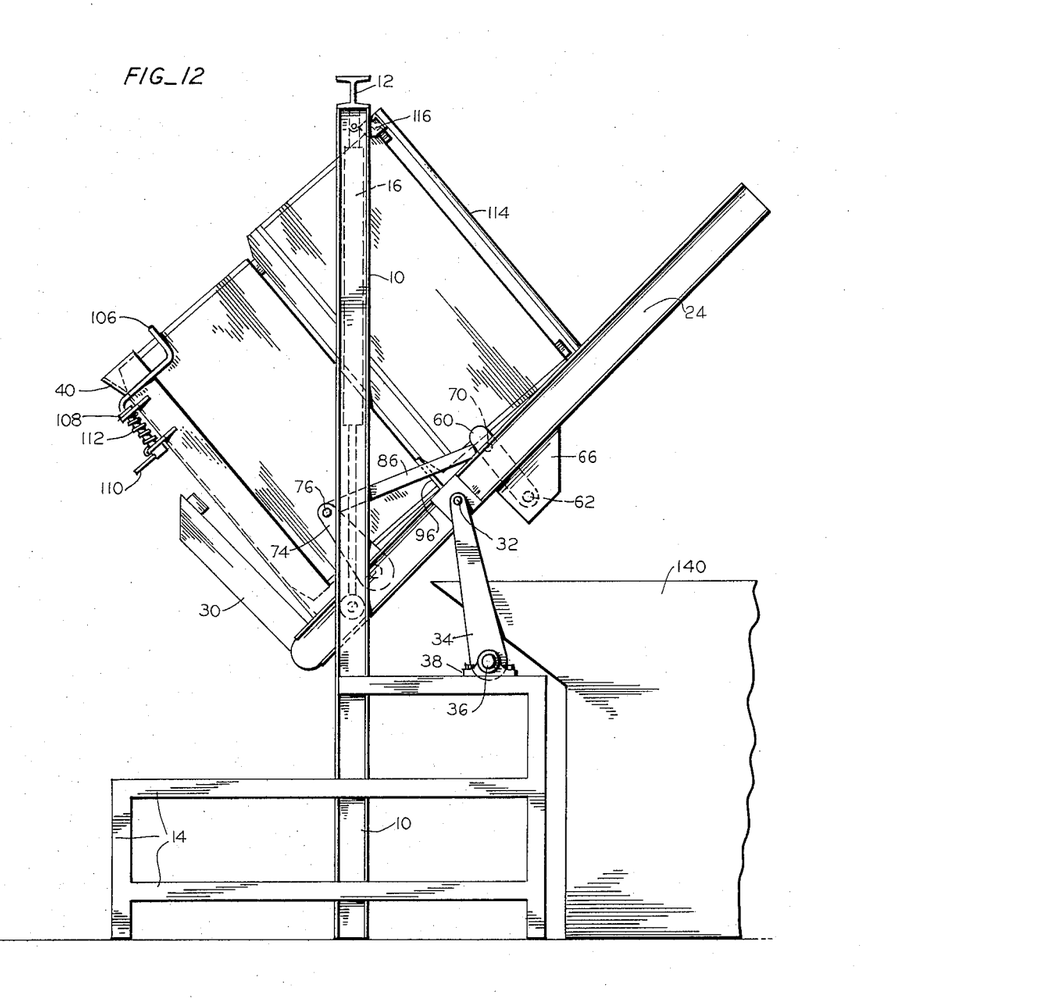
Figure 13:
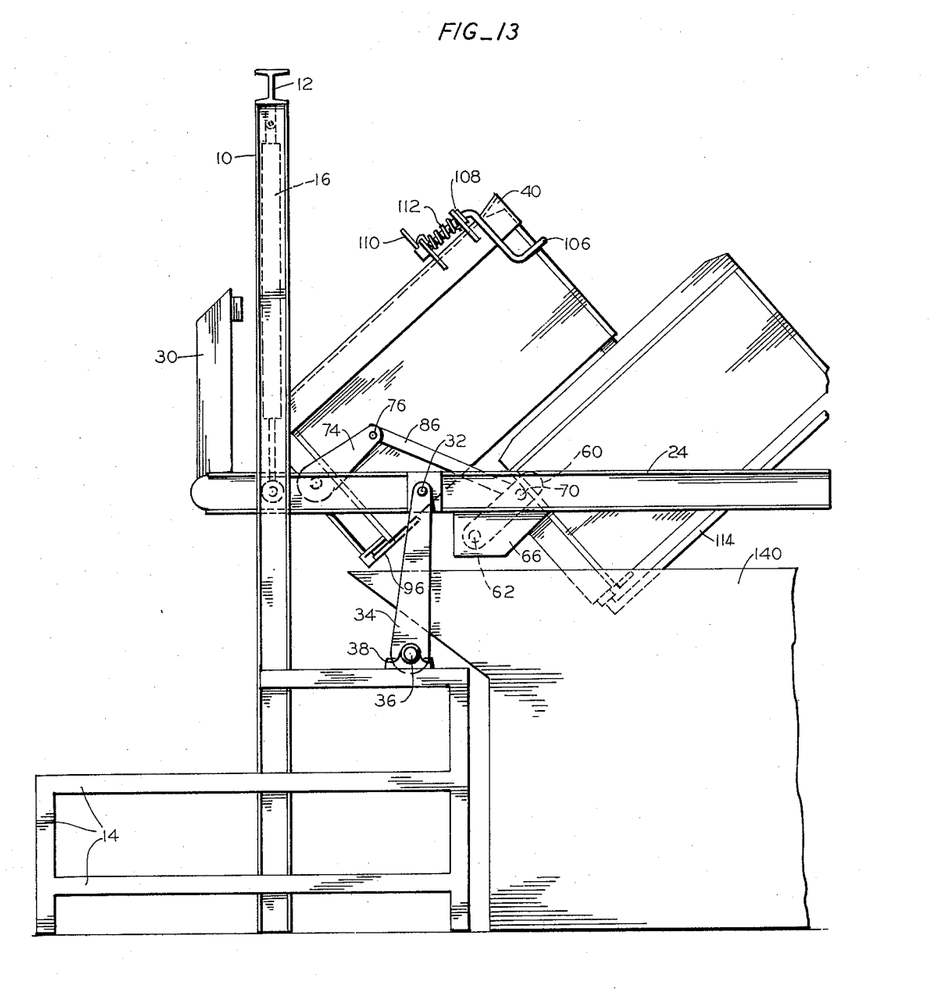

The apparatus described above is installed immediately adjacent to a hopper 140 as illustrated in FIGS. 11–13, and valve means are provided for supplying fluid under pressure to the rams 16. The valve means are preferably connected by a suitable manipulating element such as a pull chain which is positioned in a suitable location that a fork lift operation may manipulate it from his vehicle immediately after placing a pair of containers on the apparatus.

With the apparatus in the condition in which it is illustrated in FIGS. 1 and 11, the operator of a fork lift truck picks up a pair of piggyback stacked containers and transports them to the carton dumping apparatus; he manipulates his fork lift truck so that the containers are moved to a position over the base members 40 of the lower container holding frame and he lowers the containers until they rest on the members 40. Here note that the center of the lower container holding frame and the center of the inner frame are open so that the forks of the fork lift truck need not be moved during subsequent operation of the apparatus.

The apparatus is now ready for dumping of the pair of stacked containers. In this condition:

(a) The latch 106 (FIGS. 3 and 4) is unlatched by reason of the engagement of its actuating arm 110 with the main frame members 14;

(b) The arms 114 are in their outward position by reason of engagement of rocker arms 126 with the stops 132 on the inner frame (see FIG. 8);

(c) The latch 96 is unlatched since its manipulation roller 100 is held by the operating cam 102 (See FIGS. 1 and 3);

(d) The plates 134 are engaged under the bottom of the upper container under the action of springs 138, and (e) The dog 82 (see FIG. 9) is unlatched from pin 78 by reasons of the engagement of stop 90 with arm 88.

Operation of the container dumping apparatus is initiated by the fork lift operator when he pulls the pull chains (not shown) to supply fluid under pressure to the lower end of the rams 16 to cause the rams 16 to contract. The sequence of operation caused by contraction of the rams 16 is as follows:

(1) The inner frame (having upright members 24) begins to rise as the rollers 22 move up the channels 10 of the outer frame and beings to swing toward the hopper 140 as the arms 34 begin to swing.

(2) As the inner frame members 24 start to rise, the latches 106 are latched about the outer lower corners of the lower container as arms 110 move away from the main frame members 14.

(3) As the inner frame continues to rise, the angle subtended at pivot shaft 32 between the axes of rollers 22, shaft 32, and trunnion 36 decreases, but this changing of the angle does not cause operation of gears 50 and 52 because dog 82 is unlatched from pin 78 by stop member 90. This angle will first decrease and then increase as the guide rollers 22 move up to the level of the trunnion 46 and then to a distance above the trunnion 36 equal to their original distance below it.

(4) At this point the stop 78 in the aperture 80 in gear 52 again reaches the upper edge of the aperture and further rotation of the arms 34 causes rotation of the gear 52 with respect to the inner swinging frame members 24.

(a) Further swinging motion of the arms 34 and the gear 52 causes the gear 50 to rotate with respect to the frame members 24 and this causes secondary swinging of the lower container holding frame (having member 40) with respect to the outer main stationary frame and the inner frame members 24.

(b) This secondary swinging is transmitted to the upper container holding frame (having square tube 54) by means of lever arms 74, 68 and 60. The axis 62 of the upper container holding frame is offset laterally of the machine from the axis 46 of the lower container holding frame, and this secondary swinging motion is thus accompanied by movement of the upper container holding frame away from the lower container holding frame in a direction longitudinally of the inner frame members 24.

(5) As rotation of the gear 50 commences, the stops 90 (see FIG. 9) move away from the spring loaded dogs 82 so that the dogs 82 engage the stops 78 in the apertures 80 in the gears 52 to lock the gears 52 to the arms 34 and prevent whipping action of the bins when the centers of gravity of the bins cross the axes of rotation of the upper and lower container holding frames.

(6) As the lower container holding frame starts to rotate with respect to the inner frame members 24, the roller 100 (see FIG. 3) moves along cam surface 102 responsive to biasing spring 104 to move the latch members 96 over the top back edge of the lower bin. The latches 96 and 106 mentioned above act to hold the lower bin in place even if a bin is not present in the upper container holding frame; however, when a pair of bins are on the apparatus, the lower bin will often not engage the latches 106 but will merely rest upon the under surface of the upper bin.

(7) As the upper container holding frame starts to rotate with respect to the inner frame members 24, the rocker arm 126 (see FIG. 8) follows the stop member 132 by the action of its biasing spring, and this movement of the rocker arm 126 closes the arms 114 to their operative positions supporting the upper edges of the container on the upper container holding frame.

(8) The operations described at paragraphs 4–7 occur approximately at the time when the apparatus is in the position illustrated in FIG. 12. Further contraction of the rams 16 from the positions illustrated in FIG. 12 causes the inner frame members 24 to swing with respect to the outer frame uprights 10 to the position of FIG. 13 while the upper and lower container holding frames swing with respect to the inner frame members 24 in the same direction as the inner frame members 24 are swinging with respect to the outer frame members 10. It should be noted that this swinging is accompanied by translation of both the upper and lower container holding frames longitudinally of the inner frame members 24, but due to the offset of the swinging axis of the upper container holding frame, the upper container holding frame is translated further than the lower one so that additional space is opened between the upper and lower containers to facilitate dumping of the lower container.

(9) After the apparatus reaches the position illustrated in FIG. 13, and after the containers have been dumped the action of the hydraulic cylinder is reversed by the fork lift operator to reverse the sequence of steps described above. It should be noted that during the reverse sequence of steps the pivotal dog 82 (see FIG. 9) performs the important function of causing reverse swinging of the upper and lower container holding frames with respect to the inner frame members 24 until their centers of gravity cross their respective pivot axes.

While one specific embodiment of this invention has been illustrated and described in detail above, it is obvious that many modifications thereof may be made without departing from the spirit and scope of the invention.

I claim:
1. Apparatus for dumping containers which comprises:
 (a) a primary frame,
 (b) a secondary frame mounted on said primary frame for swinging movement with respect to said primary frame between a first position and a second position,
 (c) a container holding frame mounted on said secondary frame for swinging movement with respect to said secondary frame between a first position supporting a container and a second position dumping a container, and
 (d) frame swinging means for simultaneously
  (1) swinging said secondary frame with respect to said primary frame from said first position to said second position while
  (2) swinging said container holding frame with respect to said secondary frame from said first position to said second position in the same direction as said secondary frame is swinging with respect to said primary frame
  (3) said frame swinging means including drive means interconnecting said primary frame and said container holding frame for swinging said container holding frame with respect to said secondary frame responsive to swinging movement of said secondary frame with respect to said primary frame, with said drive means including releasable latch means for disengaging said drive means during a portion of the swinging movement of said secondary frame with respect to said primary frame.

2. Apparatus for dumping containers which comprises:
 (a) a primary frame,
 (b) a secondary frame mounted on said primary frame in a generally upright position and swingable upwardly on said primary frame to a position inclined at a substantial angle to said upright position,
 (c) means for swinging said secondary frame with respect to said primary frame through a swinging cycle from said upright position to said inclined position,
 (d) a container holding frame mounted on said secondary frame for swinging movement with respect to said secondary frame about a generally horizontal pivot axis on said secondary frame with said container holding frame having a container support portion for receiving a container when said secondary frame is in said upright position with the center of mass of said container spaced laterally from a vertical plane through said pivot axis,
 (e) dumping means interconnecting said primary frame and said container holding frame for swinging said container holding frame about said axis responsive to swinging of said secondary frame with respect to said primary frame, and
 (f) dumping means release means for rendering said dumping means inoperative during a portion of the swinging cycle of said secondary frame while said center of mass of said container approaches said vertical plane.

3. Apparatus for dumping containers which comprises:
 (a) a primary frame,
 (b) a secondary frame mounted on said primary frame for swinging movement with respect to said primary frame between a first position and a second position,
 (c) a pair of container holding frames mounted on said secondary frame with said container holding frames positioned adjacent to each other one above the other for individually supporting the containers of a stacked pair of containers when said secondary frame is in said first position, and
 (d) frame moving means for simultaneously
  (1) swinging said secondary frame with respect to said primary frame from said first position to said second position while
  (2) moving said container holding frames apart from each other.

4. Apparatus for dumping open-mouthed containers which comprises:
 (a) a primary frame,
 (b) a secondary frame mounted on the primary frame for swinging movement with respect to the primary frame between first and second positions,
 (c) a pair of container holding frames swingably mounted on said secondary frame with said container holding frames positioned, when said secondary frame is in said first position, to support a pair of containers in superposed relation with their open mouths facing upwardly, and
 (d) frame moving means for simultaneously
  (1) swinging said secondary frame with respect to said primary frame from said first position to said second position while
  (2) swinging said container holding frames in the same direction with respect to said secondary frame as said secondary frame swings with respect to said primary frame.

5. Apparatus for dumping open-mouthed containers which comprises:
 (a) a primary stationary frame,
 (b) a secondary frame mounted on said primary frame in a generally upright position and swingable upwardly on said primary frame to a position inclined at a substantial angle to said upright position,
 (c) means for swinging said secondary frame with respect to said primary frame between said generally upright and inclined positions,
 (d) upper and lower container holding frames mounted on said secondary frame and positioned to receive a pair of containers in superposed relation with their mouths facing upwardly when said secondary frame is in said upright position, and (e) means for swinging said upper and lower container holding frames with respect to said secondary frame to inverted positions when said secondary frame is moved to said inclined position with said container holding frames swinging in the same direction with respect to said secondary frame as said secondary frame swings with respect to said primary frame and with said upper and lower container holding frames swinging away from each other.

6. The apparatus of claim 5 characterized further in that said upper container holding frame includes support means at the top thereof positioned above a pair of superposed containers when said pair of containers is placed upon said apparatus while said secondary frame is in said upright position, and said lower container holding frame includes support means at the bottom thereof positioned underneath said pair of containers while said secondary frame is in said upright position.

7. The apparatus of claim 6 characterized further by the inclusion of additional support means on said lower container holding frame at the top thereof for preventing movement of a container on said lower frame toward said upper frame when said secondary frame is swung to said inclined position.

8. The apparatus of claim 7 characterized further by the inclusion of actuating means connected to said support means on said upper frame and said upper support means on said lower frame for retracting said two support means laterally of said secondary frame when said secondary frame approaches said upright position.

9. Apparatus for dumping open-mouthed containers which comprises:
(a) a primary stationary frame having
(1) a pair of spaced apart generally vertical channel members, and
(2) a lateral frame portion positioned at one side of said channel members,
(b) a secondary frame positioned between said channel members and having
(1) upper and lower end portions and
(2) guide means mounted on said lower portion and engaging said channel members for guiding said lower portion along a vertical path between said channel members,
(c) power means interconnecting said primary and secondary frames for lifting said lower portion of said secondary frame along said path,
(d) link means pivotally connected
(1) at one end to said lateral frame portion about a horizontal axis and
(2) at the other end to said secondary frame about a second horizontal axis above said guide means, whereby operation of said power means to lift said lower portion of said secondary frame causes the upper portion of said secondary frame to swing from an upright position to a discharge position over said lateral frame portion,
(e) a lower container holding frame mounted on said secondary frame to receive a lower container in mouth-up position when said secondary frame is in said upright position with the container positioned on the opposite side of said channel members from said lateral frame portion, and with said container holding frame pivotally connected to said secondary frame for upwardly swinging movement toward said lateral frame portion about a first pivot axis, and
(f) an upper container holding frame mounted on said secondary frame to receive an upper container in mouth-up position stacked upon said lower container, and with said upper container holding frame pivotally connected to said secondary frame for upward swinging movement toward said lateral frame portion about a second pivot axis.

10. Apparatus for dumping open-mouthed containers which comprises:
(a) a frame adapted to receive a pair of open-mouthed containers with one of the containers stacked upon and covering the mouth of the other,
(b) means connected to said frame for moving said frame along a dumping path between a generally erect position where said container mouths face upwardly and a dumping position inclined at a substantial angle to said erect position,
(c) upper container support means mounted on said frame for restraining movement of said one container away from said other container,
(d) lower container support means mounted on said frame for restraining movement of said other container toward said one container, and
(e) manipulating means interconnecting said support means for moving said support means toward and away from each other as said frame moves along said dumping path to said erect and dumping positions respectively.

11. Apparatus for dumping fruit bins delivered thereto by lift trucks which comprises:
(a) a stationary frame
(b) a movable frame mounted on said stationary frame and having
(1) a laterally facing open side for permitting introduction of a fruit bin into said frame by a fork lift truck and
(2) a bottom side having an opening therein communicating with said open side and having a first horizontal dimension parallel to said open side which is less than the width of said open side and a second horizontal dimension measured perpendicular to said first dimension which is at least one half of the dimension of said bottom side measured parallel to said second dimension for permitting the forks of a lift truck to pass through said bottom side as said frame lifts a container upwardly from said forks, and
(c) frame lifting and guide means interconnecting said frames for swinging said movable frame upwardly from a loading position where said bottom side is substantially horizontal while preventing any substantial movement of said movable frame in the lateral direction toward which said open side faces when in said loading position.

References Cited by the Examiner

UNITED STATES PATENTS

| | | | |
|---|---|---|---|
| 1,878,994 | 9/1932 | Abbe | 214—654 X |
| 2,136,448 | 11/1938 | Byington | 214—306 |
| 2,520,252 | 8/1950 | Mutchler | 214—654 |
| 2,646,902 | 7/1953 | Nussberger et al. | 214—149 X |
| 2,690,850 | 10/1954 | Welker | 214—152 |
| 2,741,379 | 4/1956 | Stryker | 214—152 |
| 2,804,982 | 9/1957 | Verrinder | 214—306 |
| 2,851,178 | 9/1958 | Rea et al. | 214—313 |
| 2,870,927 | 1/1959 | Warren | 214—313 |

FOREIGN PATENTS 558,499   1/1944   Great Britain.

GERALD M. FORLENZA, *Primary Examiner.*

HUGO O. SCHULZ, *Examiner.*